United States Patent
Graceffo et al.

(10) Patent No.: US 11,398,872 B2
(45) Date of Patent: Jul. 26, 2022

(54) OPTICAL TO ACOUSTIC COMMUNICATIONS SYSTEMS AND METHODS

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/082,548

(22) Filed: Oct. 28, 2020

(65) Prior Publication Data

US 2021/0314071 A1 Oct. 7, 2021

Related U.S. Application Data

(60) Provisional application No. 62/927,345, filed on Oct. 29, 2019.

(51) Int. Cl.
| | |
|---|---|
| *H04B 10/00* | (2013.01) |
| *H04B 13/02* | (2006.01) |
| *G01S 7/486* | (2020.01) |
| *H04B 10/50* | (2013.01) |
| *H04B 10/80* | (2013.01) |
| *G01S 15/08* | (2006.01) |
| *H04B 10/118* | (2013.01) |
| *H04J 14/00* | (2006.01) |

(52) U.S. Cl.
CPC .............. *H04B 13/02* (2013.01); *G01S 7/486* (2013.01); *G01S 15/08* (2013.01); *H04B 10/118* (2013.01); *H04B 10/503* (2013.01); *H04B 10/807* (2013.01); *G01S 2201/07* (2019.08)

(58) Field of Classification Search
CPC ... H04B 10/11; H04B 10/112; H04B 10/1121; H04B 10/1123; H04B 10/116; H04B 10/118; H04B 10/80
See application file for complete search history.

(56) References Cited

U.S. PATENT DOCUMENTS

| | | |
|---|---|---|
| 5,822,047 A | 10/1998 | Contarino et al. |
| 9,018,575 B2 | 4/2015 | Kowalevicz et al. |
| 9,165,963 B2 | 10/2015 | Kowalevicz et al. |

(Continued)

*Primary Examiner* — Daniel G Dobson
(74) *Attorney, Agent, or Firm* — Lando & Anastasi, LLP

(57) ABSTRACT

Methods and apparatus for air to underwater communications. In one example, an optical transceiver configurable between two operational modes includes a laser assembly configured to transmit a modulated laser beam when in a first mode of the two operational modes and to transmit an unmodulated beam when in a second mode of the two operational modes, an optical receiver configured to receiver reflections of the unmodulated laser beam from a surface of a body of water and to output measurement data based on the reflections of the unmodulated laser beam, and a controller configured to determine surface conditions of the surface of the body of water based on the measurement data, to adjust at least one property of the modulated laser beam based on the surface conditions, and to operably switch the laser assembly between the first and second modes.

20 Claims, 2 Drawing Sheets

(56) References Cited

U.S. PATENT DOCUMENTS

| | | |
|---|---|---|
| 9,171,219 B2 | 10/2015 | Kowalevicz |
| 9,323,034 B2 | 4/2016 | Dolgin |
| 9,400,414 B2 | 7/2016 | Kowalevicz |
| 9,451,185 B2 | 9/2016 | Dolgin et al. |
| 9,503,660 B2 | 11/2016 | Kowalevicz et al. |
| 9,535,245 B1 | 1/2017 | Kowalevicz |
| 9,538,096 B2 | 1/2017 | Dolgin |
| 9,887,779 B2 | 2/2018 | Kowalevicz |
| 9,973,281 B2 | 5/2018 | Kowalevicz et al. |
| 10,164,765 B2 | 12/2018 | Dolgin et al. |
| 10,177,856 B2 | 1/2019 | Kowalevicz et al. |
| 10,205,526 B2 | 2/2019 | Kowalevicz |
| 10,225,020 B2 | 3/2019 | Dolgin et al. |
| 10,228,277 B1 | 3/2019 | Land et al. |
| 10,243,670 B2 | 3/2019 | Kowalevicz et al. |
| 10,243,673 B2 | 3/2019 | Dolgin et al. |
| 10,250,292 B2 | 4/2019 | Graceffo et al. |
| 10,256,917 B2 | 4/2019 | Dolgin et al. |
| 10,305,602 B2 | 5/2019 | Dolgin et al. |
| 10,313,022 B2 | 6/2019 | Dolgin et al. |
| 10,340,965 B2 | 7/2019 | Dolgin et al. |
| 10,374,743 B2 | 8/2019 | Dolgin et al. |
| 10,378,880 B2 | 8/2019 | Dolgin et al. |
| 10,498,464 B2 | 12/2019 | Graceffo et al. |
| 10,530,494 B2 | 1/2020 | Dolgin et al. |
| 10,554,306 B1 | 2/2020 | Graceffo et al. |
| 10,571,774 B2 | 2/2020 | Graceffo et al. |
| 10,637,580 B2 | 4/2020 | Dolgin et al. |
| 10,686,533 B2 | 6/2020 | Dolgin et al. |
| 10,714,251 B2 | 7/2020 | Dolgin et al. |
| 10,826,603 B1 | 11/2020 | Kowalevicz et al. |
| 10,924,189 B2 | 2/2021 | Kowalevicz et al. |
| 11,012,160 B2 | 5/2021 | Kowalevicz et al. |
| 11,101,896 B2 | 8/2021 | Kowalevicz et al. |
| 11,133,873 B1 | 9/2021 | Kowalevicz et al. |
| 11,159,244 B2 | 10/2021 | Graceffo et al. |
| 11,159,245 B2 | 10/2021 | Kowalevicz et al. |
| 2017/0184399 A1* | 6/2017 | Thayer .................. G01S 7/499 |
| 2018/0045544 A1 | 2/2018 | Dawson et al. |
| 2020/0136727 A1 | 4/2020 | Graceffo et al. |
| 2020/0371328 A1 | 11/2020 | Kowalevicz et al. |
| 2020/0403709 A1 | 12/2020 | Graceffo et al. |
| 2020/0409189 A1 | 12/2020 | Graceffo et al. |
| 2021/0006336 A1 | 1/2021 | Kowalevicz et al. |
| 2021/0021351 A1 | 1/2021 | Kowalevicz et al. |
| 2021/0021449 A1 | 1/2021 | Graceffo et al. |
| 2021/0041515 A1 | 2/2021 | Dolgin |
| 2021/0099232 A1 | 4/2021 | Graceffo et al. |
| 2021/0099234 A1 | 4/2021 | Graceffo et al. |
| 2021/0105073 A1 | 4/2021 | Graceffo et al. |
| 2021/0126715 A1 | 4/2021 | Graceffo et al. |
| 2022/0014276 A1 | 1/2022 | Kowalevicz et al. |

* cited by examiner

OPTICAL TO ACOUSTIC COMMUNICATIONS SYSTEMS AND METHODS

CROSS-REFERENCE TO RELATED APPLICATIONS

This application claims priority under 35 USC § 119(e) to U.S. Provisional Patent Application Ser. No. 62/927,345, titled "OPTICAL TO ACOUSTIC COMMUNICATIONS SYSTEMS AND METHODS," filed Oct. 29, 2019, which is incorporated by reference herein in its entirety for all purposes.

BACKGROUND

Communications between an aircraft or satellite and submarines or other submerged devices is very difficult. Several techniques exist for closing this link, but all have limitations. For example, a common method of communicating from free space to an underwater vehicle is to use low frequency radio frequency communication. This method, however, requires very large antennas, high power and has very low data rates.

SUMMARY OF INVENTION

Aspects and embodiments provide improved systems and methods for establishing communications links between an underwater object and an airborne or space-based object based on a combined acoustic and optical approach, which uses water surface tension to convert between the two communications mediums. Aspects and embodiments take advantage of the ability of light (optical signals) to propagate easily through free space and the ability of sound (acoustic signals) to propagate through water. As discussed in more detail below, aspects and embodiments use the nearly infinite impedance mismatch at the boundary between the water surface and air as a natural transducer to convert optical energy into acoustic energy for the purpose of communications. Additionally, certain embodiments include a mechanism for correcting for waveform perturbations introduced by sea state action, as discussed further below.

According to one embodiment, an optical to acoustic communications method for air to underwater communication comprises transmitting a modulated laser beam from an air-based platform towards a surface of a body of water, using sonar, detecting an acoustic wave within the body of water produced from interactions of the modulated laser beam with the surface of the body of water, and recovering information encoded in a modulation of the modulated laser beam by measuring properties of the acoustic wave.

In one example, transmitting the modulated laser beam includes transmitting an intensity-modulated laser beam towards the surface of the body of water. The method may further comprise optically measuring surface conditions of the body of water, and adjusting at least one property of the modulated laser beam based on the surface conditions. In one example, optically measuring the surface conditions includes transmitting an unmodulated laser beam towards the surface of the body of water, receiving reflections of the unmodulated laser beam from the surface of the body of water, and determining at least one characteristic of the surface conditions based on the reflections of the unmodulated laser beam. In one example, adjusting the at least one property of the modulated laser beam includes adjusting a frequency of the modulated laser beam. In another example, determining the at least one characteristic of the surface conditions includes measuring at least one of an average height and a rate of change of undulations of the surface. In another example, transmitting the modulated laser beam includes transmitting pulses of the modulated laser having a predetermined pulse spacing corresponding to a symbol spacing of symbols of the information encoded in a modulation of the modulated laser beam. In one example, adjusting the at least one property of the modulated laser beam includes adjusting the symbol spacing. In another example, transmitting the unmodulated laser beam includes transmitting pulses of the unmodulated laser between the pulses of the modulated laser beam. In another example, transmitting the modulated laser beam includes transmitting the modulated laser beam having a first wavelength, and transmitting the unmodulated laser beam includes transmitting the unmodulated laser beam having a second wavelength different from the first wavelength.

According to another embodiment, an optical transceiver for air to underwater communications configurable between two operational modes comprises a laser assembly configured to transmit a modulated laser beam when in a first mode of the two operational modes and to transmit an unmodulated beam when in a second mode of the two operational modes, an optical receiver configured to receiver reflections of the unmodulated laser beam from a surface of a body of water and to output measurement data based on the reflections of the unmodulated laser beam, and a controller configured to determine surface conditions of the surface of the body of water based on the measurement data, to adjust at least one property of the modulated laser beam based on the surface conditions, and to operably switch the laser assembly between the first and second modes.

In one example, the optical receiver is a LiDAR receiver.

In one example, the controller includes an encoder configured to control modulation characteristics of the modulated laser beam, including symbol timing of symbols of information encoded by modulation of the modulated laser beam. The controller may further include a decoder and feedback assembly configured to receive the measurement data and to provide feedback information to at least one of the laser assembly and the encoder based on the measurement data. In one example, the encoder receives the feedback information from the decoder and feedback assembly and adjusts the symbol timing based on the feedback information. In another example, the encoder is configured to adjust a frequency of the modulated laser beam based on the feedback information.

In one example, in the first mode, the laser assembly transmits pulses of the modulated laser beam corresponding to the symbols of information, and in the second mode, the laser assembly transmits pulses of the unmodulated laser beam, the controller being configured to switch the laser assembly into the second mode in between transmission of the pulses of the modulated laser beam. In one example, the modulated laser beam has a lower pulse-repetition-rate and a higher instantaneous power than the unmodulated laser beam.

In one example, a modulation of the modulated laser beam is intensity modulation or pulse width modulation.

In another example, the first mode is a communications mode and the second mode is a measurement mode. In one example, the modulated laser beam has a first wavelength, and the unmodulated laser beam has a second wavelength different from the first wavelength. In another example, the first wavelength is selected for maximum absorption by the body of water and the second wavelength is selected for maximum reflection from the surface of the body of water.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspect and embodiments are directed to a combined acoustic-optical communications method and system that can be used to establish a communications link between an underwater object, such as a submarine, and an object that transmits and receives optical signals through free space, such as a ship, an aircraft, or a satellite, for example (referred to herein as a "airborne platform"). In particular, aspects and embodiments provide an improved method for communicating information from the airborne platform to the submarine that leverages properties of the air-water boundary, as discussed in more detail below.

Figure 1:
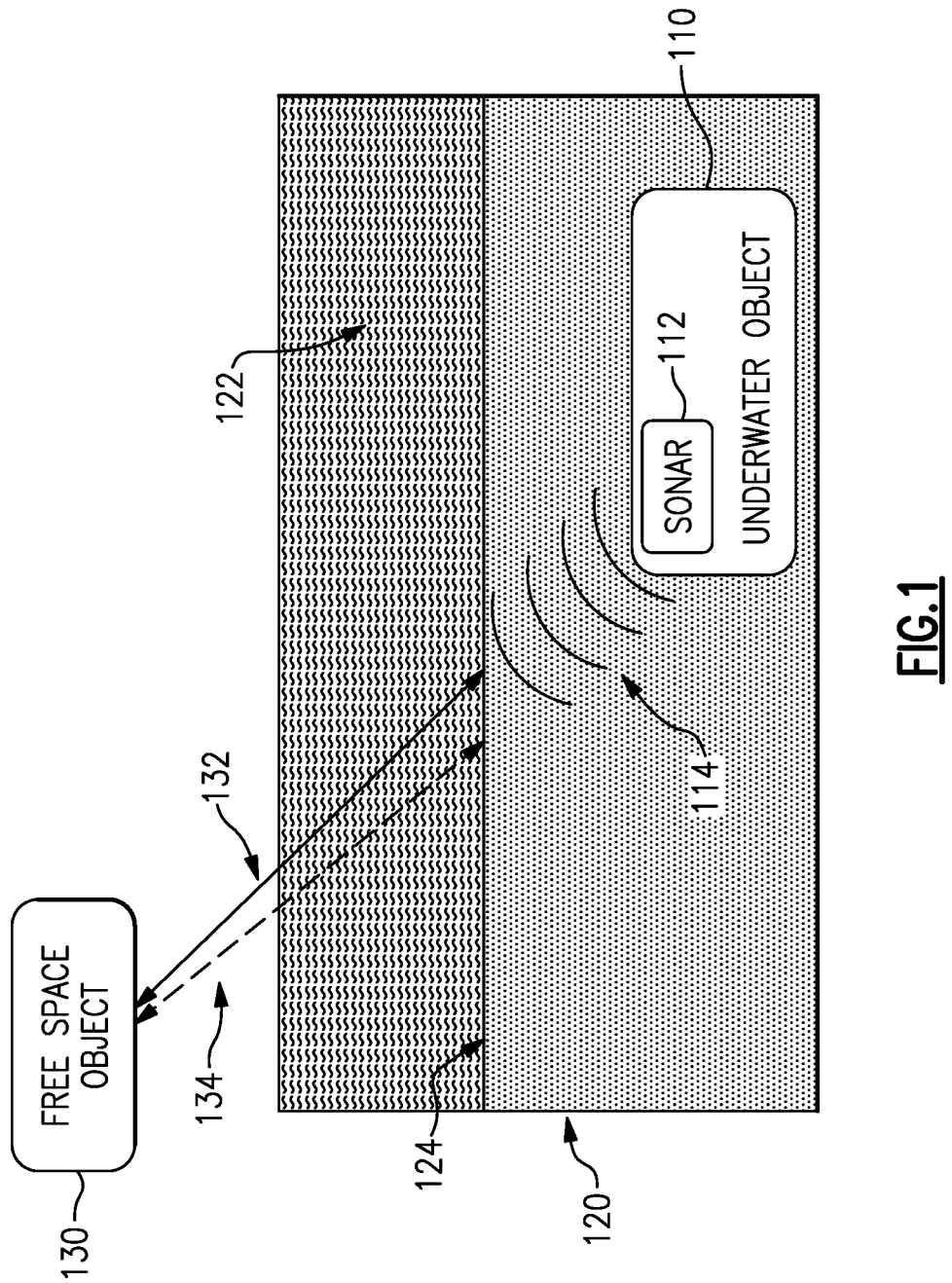
FIG. 1 is a block diagram of an acoustic-optical communications system according to aspects of the present invention.

FIG. 1 is a block diagram of one example of such a communications system according to certain embodiments. Referring to FIG. 1, an underwater object 110 (generally referred to below as a submarine) is submerged in a body of water 120, such as an ocean. Communication is desired between the submarine 110 and an airborne platform 130. According to certain embodiments, a data-modulated laser beam 132 transmitted by the airborne platform 130 is used to create a thermal acoustic signature on the surface 122 of the water 120. The laser beam 132 heats a small area along the surface 122 of the water 120, creating temperature variations that are detectable by sonar 112. Effectively, the water surface 122 becomes an optical to acoustic transducer, which converts light energy to an acoustic wave 114. According to certain embodiments, to create the thermal signature, a laser is selected to generate the laser beam 132 with an optical wavelength that will transfer the most heat to the water molecules on the surface 122 of the water 120. In certain examples, optimal wavelengths are in a range of about 3 to 10 µm. The heat generated during the collision of the laser beam 132 with the water molecules creates a temperature gradient. The temperature gradient creates an impedance mismatch in the water 120, which is detectable by the sonar 112. Information encoded in the modulation of the modulated laser beam can be recovered by measuring properties of the acoustic wave 114.

Figure 2:
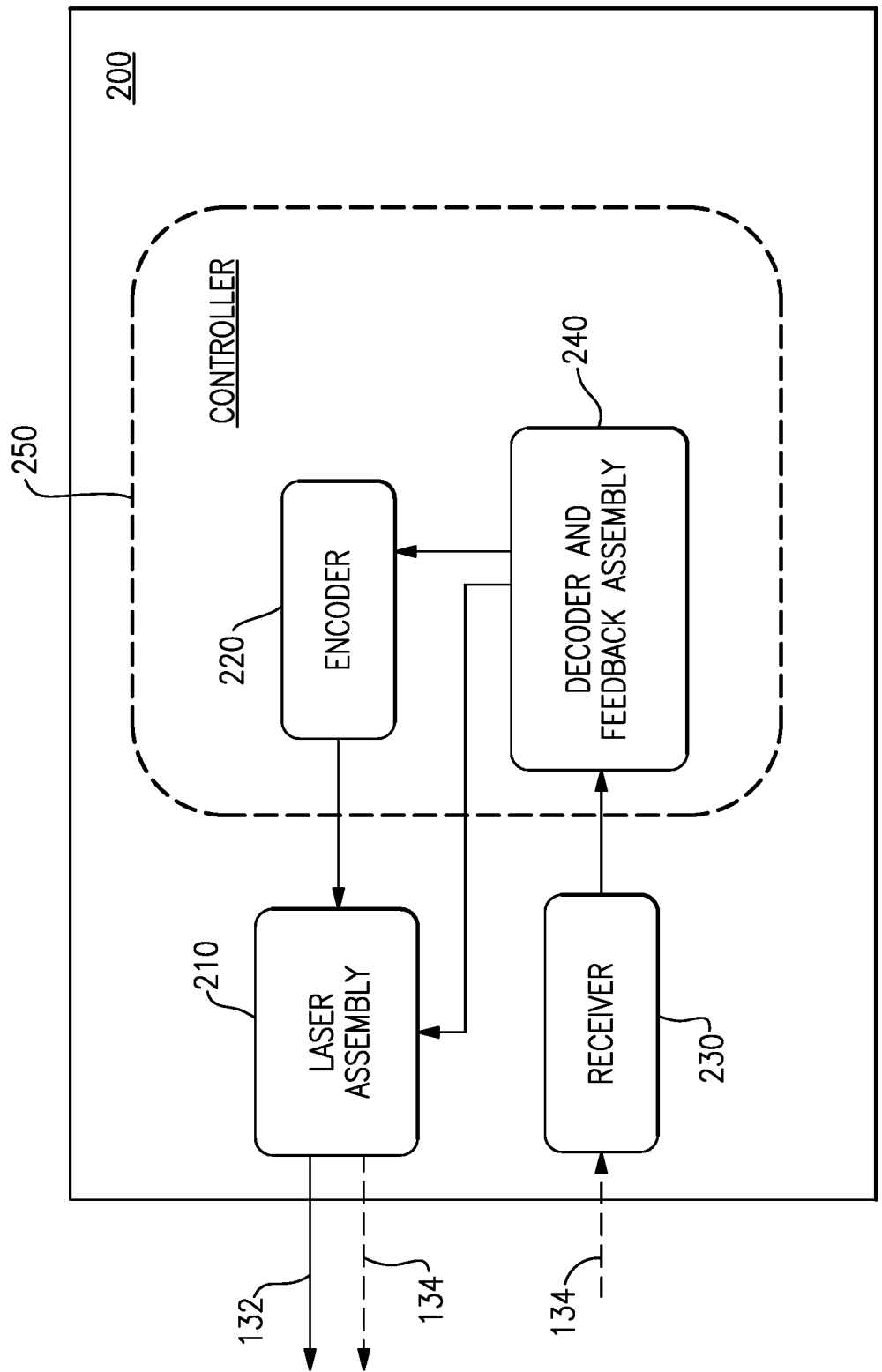
FIG. 2 is a block diagram of one example of an optical transceiver according to aspects of the present invention.

Referring to FIG. 2, there is illustrated a block diagram of one example of an optical transceiver that may be included on the airborne platform 130 and configured to generate the laser beam 132 for communicating with the submarine 110. The optical transceiver 200 includes a laser assembly 210 that includes at least one laser configured to generate the laser beam 132. The optical transceiver 200 further includes an encoder 220 that is configured to control the laser assembly to modulate the laser beam 132 using a particular modulation scheme, as discussed further below, to encode information onto the laser beam 132 such that the information can be transmitted to the underwater object 110. Accordingly, the encoder 220 may include a variety of components, such as electronics to produce the symbols corresponding to a data payload (information) to be transmitted, a modulator, control electronics for actuating the laser(s) included in the laser assembly 210 and optionally controlling the laser assembly to adjust the wavelength, transmit power, or other characteristics of the laser beam 132, and various other components that may be typically included in an optical transmitter and as would be recognized and understood by those skilled in the art, given the benefit of this disclosure. In one example, the encoder 220 and laser assembly 210 may constitute or be part of a LiDAR transmitter.

According to certain embodiments, data is transmitted from the airborne platform 130 to the submarine 110 by altering the acoustic signature produced at the water surface 122. For example, a form of pulse width modulation on the laser beam 132 can be used to vary the duration and intensity of the laser induced temperature changes at and near the water surface 122, while keeping the duty cycle constant. For such an implementation, the rising edge of each burst may start on a fixed interval. For a symbol length of one bit, two burst durations may be defined to signal the transmission of a one-bit or a zero-bit. For a system with two bits per symbol, four distinct pulse widths are required two signal the transmission of the appropriate bit pair, while again having the bursts occur at fixed intervals and the duty cycle fixed. Similar bi-state or multistate methods can be implemented using frequency, phase and amplitude modulation methods, as will be appreciated by those skilled in the art, given the benefit of this disclosure. As noted above, the encoded 220 may include suitable electronics to implement the desired modulation method and rate of data transmission.

In certain embodiments, the optical transceiver 200 can be further configured to use optical measurements to compensate for changes in the communications channel introduced by the undulation of the water surface 122. When communicating through the air-water interface boundary 124, the sea state introduces turbulent effects on the modulated laser beam 132 that distort the transmission. The type and level of distortion depends on the method of modulation and the current sea state. For example, modulation methods using phase or time interval measurements are affected by the undulation of the water's surface 122. The undulations continually change the distance between the surface 122 and the receiver on the underwater object 110. The changing distance affects the inter-symbol arrival time, which perturbs time and phase measurements. In another example, modulation methods using frequency measurements are affected by the rate of surface undulation. If the rate of undulation is in resonance with critical signal frequency components, then these components may become obscured, resulting in improper demodulation. Accordingly, aspects and embodiments provide a mechanism by which to measure and compensate for these effects.

In one embodiment, the laser assembly 210 can be used to make optical measurements to characterize the state of the air-water interface 124. For example, both the frequency and the level of undulation of the water's surface 122 from the mean surface depth can be determined. In certain examples, this can be accomplished by taking advantage of the fact that a laser's pulse repetition rate can be much greater than the symbol rate. The high pulse repetition rate allows for sampling the surface 122 in-between data transmissions to determine the state of the surface. Thus, according to certain embodiments, in addition to transmitting the modulated laser beam 132, the laser assembly 210 can be further configured to transmit a laser measurement beam 134. The laser measurement beam may be used to perform optical measurements to obtain data about the conditions of the surface 122 of the water 120, which can be used to adjust the modulation (and optionally other characteristics) of the laser beam 132 to improve the accuracy and reliability of the communications channel between the airborne platform 130 and the underwater object 110. In certain examples, the wavelength of the laser measurement beam is different from the wavelength of the laser beam 132. For example, the wavelength of the laser beam 132 may be selected for maximum absorption by the water 120, whereas the wavelength of the laser measurement beam 134 may be selected for maximum reflection from the water surface 122. Accordingly, in certain examples, the laser assembly 210 may include at least one laser configured to produce the laser beam 132, as discussed above, and at least one additional laser to produce the laser measurement beam 134.

Still referring to FIG. 2, in certain such embodiments, the optical transceiver 200 may further include a receiver 230 that receives reflections of the laser measurement beam 134 from the water 120, along with a decoder and feedback assembly 240 that receives measurements from the receiver 230. In certain examples, the encoder 220 and the decoder and feedback assembly 240 may form part of, or include electronics from, an overall system controller 250. The receiver 230 may include system optics, such as one or lenses and/or mirrors, for receiving the laser measurement beam 134 from the water surface 122. In certain examples, the laser assembly 210 may include, or may be coupled to, optics (such as one or more lenses and/or mirrors) for conditioning (e.g., collimating, focusing, magnifying, etc.) the laser beam 132 for transmission to the surface 122. The optics used by the laser assembly 210 may be the same or different from the system optics used by the receiver 230. In one example, the receiver 230 may be or include a LiDAR receiver, for example. The receiver 230 receives the laser measurement beam 134 and outputs corresponding measurement data. This may be a standard type of output for a LiDAR receiver, for example.

In certain embodiments, the energy per laser pulse required to make measurements (i.e., transmit power of the laser measurement beam 134) may be significantly less than the energy required to close a communications link between the airborne platform 130 and the underwater object 110 (i.e., transmit power of the laser beam 132). Accordingly, in certain examples, the optical transceiver 200 may be configurable (e.g., under control of the system controller 250) between two operational modes, namely a measurement mode and a communications mode. In the measurement mode, the laser assembly 210 is configured to transmit the unmodulated laser measurement beam 134 at a greater pulse-repetition-rate and reduced power compared to transmission of the laser beam 132 in the communications mode. In the communications mode, the laser assembly 210 is configured to transmit the modulated laser beam 132 at a reduced pulse-repetition-rate and greater instantaneous power compared to transmission of the laser measurement beam 134 in the measurement mode. In certain examples, the pulse-repetition rates and power levels can be selected such that the average power is constant for both operational modes. In certain examples, the laser assembly 210 may use the same laser(s) to produce the modulated laser beam 132 and the unmodulated laser measurement beam 134. As discussed above, in certain examples, the wavelengths of the laser beam 132 and the laser measurement beam 134 are different, and therefore, if the same laser is used to produce both beams, the laser may have to have a controllably variable wavelength. In other examples, as discussed above, the laser assembly 210 may include one or more lasers to produce the modulated laser beam 132 and one or more other lasers to produce the laser measurement beam 134, such that the wavelengths of the two beams may be different. Thus, the optical transceiver 200 operate at two different wavelengths in the two operational modes (one wavelength for the communications mode, and a different wavelength for the measurement mode).

The decoder and feedback assembly 240 receives the measurement data from the receiver 230 and extracts information therefrom that characterizes conditions of the water surface 122, such as the height and rate of undulations, or other characteristics that may affect the communications channel. The decoder and feedback assembly 240 may use the information obtained from the measurements made using the laser measurement beam to control the laser assembly 210 to adjust one or more properties of the laser beam 132 and/or to provide information to the encoder 220. Based on the information received from the decoder and feedback assembly 240, the encoder 220 may adjust certain properties of the modulation applied to the laser beam 132 to compensate for conditions of the communications channel. For example, for modulation methods using phase or time interval measurements, measurements made in the measurement mode can be used by the encoder 220 to adjust signal timing on a symbol-by-symbol basis, to compensate for the changing transmission channel length. In another example, for modulation methods that use frequency measurements such as Frequency Shift Keying (FSK), measurements made in the measurement mode can be used to select the best frequencies from an available frequency set for various forms of frequency modulation.

As noted above, the data rate for acoustic signals is slow, whereas the optical signals can support a very high pulse repetition rate. Accordingly, the optical transceiver can be switched into the measurement mode between symbol transmissions in the communications mode (e.g., between each symbol or at other regular or irregular intervals) to allow the channel conditions to be determined in "real time" and the modulation characteristics of the laser beam 132 to be dynamically altered to remove the effects of standard channel deformation and noise to improve communications with the underwater object 110. In certain examples, the rate of measurements (i.e., how often the optical transceiver 200 is switched into the measurement mode) may be variable and altered as needed. For example, when the surface conditions are highly turbulent, measurements may be made frequently, for example, between each symbol or even multiple times between adjacent symbols, whereas when the surface conditions are calm, channel measurements may be made less frequently.

Thus, aspects and embodiments provide an optical to acoustic method for air to underwater communication. Unlike conventional communications methods that attempt to use signal frequencies that can propagate through both the air and the water, and which must compensate for the changing medium properties at the air-water boundary 124, embodiments of the system and method disclosed herein take advantage of the boundary 124 to "convert" the communications channel from optical signals 132 to acoustic signals 114. As discussed above, the optical energy is used to create thermal variations at the surface layer of the water, creating a localized impedance change that is detectable by sonar. Modulation is accomplished by altering the thermal signature. The use of optical signals, rather than radar or microwave signals, may provide several advantages. For example, an optical transmitter (e.g., the encoder 220 in combination with the laser assembly 210, or components thereof) has a greater directivity as compared to a microwave transmitter, which results in a smaller beam spot size (less area) with greater power spectral density at the water surface. In addition, an optical receiver (e.g., the receiver 230), with significantly shorter wavelengths than those of microwave frequencies, has greater feature sensitivity. As discussed above, in certain embodiments, the optical to acoustic communications systems and methods may include a mechanism for sensing/measuring the water conditions in the region of the communications channel, and for making corrections to compensate for the effects of the water/channel conditions on the communications signal. For example, the optical transceiver 200 may be dynamically reconfigured between a communications mode and measurement mode to allow for "real-time" measurements and adjustments to improve the quality and reliability of the communications link between the airborne platform 130 and the underwater object 110. In certain examples, the communications mode is characterized by lower pulse-repetition-rate and greater instantaneous power than the measurement mode, and conversely, the measurement mode is characterized by higher pulse-repetition-rate and lower instantaneous power than the communications mode.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments of the methods and apparatuses discussed herein are not limited in application to the details of construction and the arrangement of components set forth in the description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. An optical to acoustic communications method for air to underwater communication, the method comprising:
   transmitting a modulated laser beam from an air-based platform towards a surface of a body of water;
   using sonar, detecting an acoustic wave within the body of water produced from interactions of the modulated laser beam with the surface of the body of water; and
   recovering information encoded in a modulation of the modulated laser beam by measuring properties of the acoustic wave.

2. The method of claim 1 wherein transmitting the modulated laser beam includes transmitting an intensity-modulated laser beam towards the surface of the body of water.

3. The method of claim 2 further comprising:
   optically measuring surface conditions of the body of water; and
   adjusting at least one property of the modulated laser beam based on the surface conditions.

4. The method of claim 3 wherein optically measuring the surface conditions includes:
   transmitting an unmodulated laser beam towards the surface of the body of water;
   receiving reflections of the unmodulated laser beam from the surface of the body of water; and
   determining at least one characteristic of the surface conditions based on the reflections of the unmodulated laser beam.

5. The method of claim 4 wherein adjusting the at least one property of the modulated laser beam includes adjusting a frequency of the modulated laser beam.

6. The method of claim 4 wherein determining the at least one characteristic of the surface conditions includes measuring at least one of an average height and a rate of change of undulations of the surface.

7. The method of claim 4 wherein transmitting the modulated laser beam includes transmitting pulses of the modulated laser having a predetermined pulse spacing corresponding to a symbol spacing of symbols of the information encoded in a modulation of the modulated laser beam.

8. The method of claim 7 wherein adjusting the at least one property of the modulated laser beam includes adjusting the symbol spacing.

9. The method of claim 7 wherein transmitting the unmodulated laser beam includes transmitting pulses of the unmodulated laser between the pulses of the modulated laser beam.

10. An optical transceiver for air to underwater communications configurable between two operational modes, the optical transceiver comprising:
    a laser assembly configured to transmit a modulated laser beam when in a first mode of the two operational modes and to transmit an unmodulated beam when in a second mode of the two operational modes;
    an optical receiver configured to receiver reflections of the unmodulated laser beam from a surface of a body of water and to output measurement data based on the reflections of the unmodulated laser beam; and
    a controller configured to determine surface conditions of the surface of the body of water based on the measurement data, to adjust at least one property of the modulated laser beam based on the surface conditions, and to operably switch the laser assembly between the first and second modes.

11. The optical transceiver of claim 10 wherein the optical receiver is a LiDAR receiver.

12. The optical transceiver of claim 10 wherein the controller includes an encoder configured to control modulation characteristics of the modulated laser beam, including symbol timing of symbols of information encoded by modulation of the modulated laser beam.

13. The optical transceiver of claim 12 wherein the controller further includes a decoder and feedback assembly configured to receive the measurement data and to provide feedback information to at least one of the laser assembly and the encoder based on the measurement data.

14. The optical transceiver of claim 13 wherein the encoder receives the feedback information from the decoder and feedback assembly and adjusts the symbol timing based on the feedback information.

15. The optical transceiver of claim 13 wherein the encoder is configured to adjust a frequency of the modulated laser beam based on the feedback information.

16. The optical transceiver of claim 12 wherein, in the first mode, the laser assembly transmits pulses of the modulated laser beam corresponding to the symbols of information; and
wherein, in the second mode, the laser assembly transmits pulses of the unmodulated laser beam, the controller being configured to switch the laser assembly into the second mode in between transmission of the pulses of the modulated laser beam.

17. The optical transceiver of claim 16 wherein the modulated laser beam has a lower pulse-repetition-rate and a higher instantaneous power than the unmodulated laser beam.

18. The optical transceiver of claim 10 wherein a modulation of the modulated laser beam is intensity modulation or pulse width modulation.

19. The optical transceiver of claim 10 wherein the first mode is a communications mode and the second mode is a measurement mode.

20. The optical transceiver of claim 19 wherein the modulated laser beam has a first wavelength, and wherein the unmodulated laser beam has a second wavelength different from the first wavelength.

* * * * *